United States Patent [19]

Citta et al.

[11] Patent Number: 5,049,992
[45] Date of Patent: Sep. 17, 1991

[54] HDTV SYSTEM WITH RECEIVERS OPERABLE AT DIFFERENT LEVELS OF RESOLUTION

[75] Inventors: Richard W. Citta, Oak Park; Jerry K. Pearlman, Wilmette, both of Ill.

[73] Assignee: Zenith Electronics Corporation, Glenview, Ill.

[21] Appl. No.: 573,436

[22] Filed: Aug. 27, 1990

[51] Int. Cl.5 .................. H04N 7/01; H04N 11/20
[52] U.S. Cl. ...................... 358/140; 358/11
[58] Field of Search .......... 358/133, 135, 138, 137, 358/140, 141, 12, 11

[56] References Cited

U.S. PATENT DOCUMENTS

| | | | |
|---|---|---|---|
| 4,276,565 | 6/1981 | Dalton et al. | 358/140 |
| 4,504,860 | 3/1985 | Nicol et al. | 358/133 |
| 4,541,012 | 9/1985 | Tescher | 358/135 |
| 4,578,704 | 3/1986 | Gharavi | 358/135 |
| 4,581,638 | 4/1986 | Chiariglione et al. | 358/133 |
| 4,633,296 | 12/1986 | Cham et al. | 358/12 |
| 4,698,689 | 10/1987 | Tzou | 358/133 |
| 4,772,949 | 9/1988 | Nadan | 358/141 |
| 4,797,742 | 1/1989 | Sugiyama et al. | 358/141 |
| 4,829,378 | 5/1989 | LeGall | 358/133 |
| 4,918,524 | 4/1990 | Ansari et al. | 358/138 |
| 4,943,855 | 7/1990 | Bheda et al. | 358/133 |
| 4,953,020 | 8/1990 | De With | 358/133 |
| 4,965,754 | 10/1990 | Stansfield et al. | 358/133 |
| 4,969,040 | 11/1990 | Gharavi | 358/136 |
| 4,989,091 | 1/1991 | Lucas | 358/140 |
| 5,001,562 | 3/1991 | Tabata et al. | 358/140 |

Primary Examiner—Tommy P. Chin
Assistant Examiner—Michael H. Lee

[57] ABSTRACT

A 787.5 line progressively scanned wideband video signal is sub-band coded for providing a plurality of (9×9) blocks of spectral coefficients, each representing a respective spatial portion of the video signal. Each block of coefficients is transmitted in truncated form and received by either a first receiver or a second receiver. The first receiver processes the received coefficients for deriving a (9×9) block of video pixels corresponding to each block of coefficients and produces a high resolution 787.5 line progressively scanned video image in response thereto. The second receiver processes the received coefficients for deriving a (6×6) block of video pixels corresponding to each block of coefficients and produces a lower resolution 525 line progressively scanned video image in response thereto.

49 Claims, 8 Drawing Sheets

HDTV SYSTEM WITH RECEIVERS OPERABLE AT DIFFERENT LEVELS OF RESOLUTION

BACKGROUND OF THE INVENTION

The present invention relates generally to high definition television (HDTV) systems and particularly concerns an HDTV system in which a broadcast video signal can be reproduced by different receivers at different levels of resolution.

Numerous HDTV systems have been proposed for transmitting a wideband video signal through a channel of limited bandwidth, such as a standard 6 MHz television channel. Since the HDTV source video signal typically has a bandwidth on the order of 37 MHz, the signal must be substantially compressed prior to transmission. Various data compression techniques have been proposed for this purpose including a number of techniques based on sub-band coding. Sub-band coding, as the term is used herein, refers generally to a process wherein the source video signal is converted into a plurality of spectral coefficients either by spatially filtering the video signal or by subjecting it to a suitable block transform, such as the discrete cosine transform (DCT). In either case, the video signal is separated into a plurality of sub-bands each comprising a series of spectral coefficients, with the coefficients derived for each sub-band representing a different spectral component of a respective block of the video image. The sub-band coefficients are subsequently processed in accordance with a data compression algorithm to allow for their transmission within the available bandwidth of the transmission channel. In order to reproduce the transmitted signal, a block of coefficients is derived for each block of the video image and the coefficient blocks are processed in an inverse sub-band coder to reconstruct a representation of the source video signal.

Normally, an identical block structure is used both at the transmitter to encode the video signal and at the receiver to decode it. For example, the source video signal may be encoded using an (8 × 8) block structure wherein a block of 64 spectral coefficient terms are generated corresponding to each (8 × 8) pixel block of the source video signal. Each coefficient term is generated in a process which is the equivalent of multiplying each pixel in a given pixel block by a respective value of a selected 64-value basis function within a given sampling interval, and then summing the results. At the receiver, the reconstructed image is obtained by decoding successive blocks of 64 spectral coefficient terms to derive corresponding (8 × 8) pixel blocks for display. In the receiver, each pixel is derived in a process which is the equivalent of multiplying each coefficient by 64 corresponding values of 64 different inverse basis functions within the given sampling interval, and then summing the results. In this example, processing circuits operating at speeds of about 80 MHz in both the transmitter and receiver ar required. Processing circuits capable of operating at such high speeds are quite costly and therefore pose a limitation on the near-term introduction of reasonably priced HDTV receivers. Display devices, e.g. CRT's, capable of displaying an image with the resolution afforded by the HDTV signal are also quite costly and therefore impose another limitation on the introduction of reasonably priced HDTV receivers.

OBJECTS OF THE INVENTION

It is therefore a basic object of the present invention to provide an HDTV system in which reasonably priced receivers may be used to reproduce a representation of a transmitted HDTV signal.

It is a further object of the invention to provide an HDTV system in which relatively high priced receivers may be used to reproduce a representation of a transmitted HDTV signal at full resolution and lower priced receivers may be used to reproduce a representation of the HDTV signal at lower resolution.

It is yet another object of the invention to provide an HDTV system of the foregoing type in which the lower resolution provided by the lower priced receivers is effected by corresponding reductions in display resolution and signal processing resolution.

DESCRIPTION OF THE DRAWINGS

These and other objects and advantages of the invention will be apparent upon reading the following description in conjunction with the drawings, in which:

FIGS. 9A, 9B-11A, 11B are diagrams useful in explaining the operation of the receivers of the invention.

DESCRIPTION OF THE PREFERRED EMBODIMENTS

Figure 1:
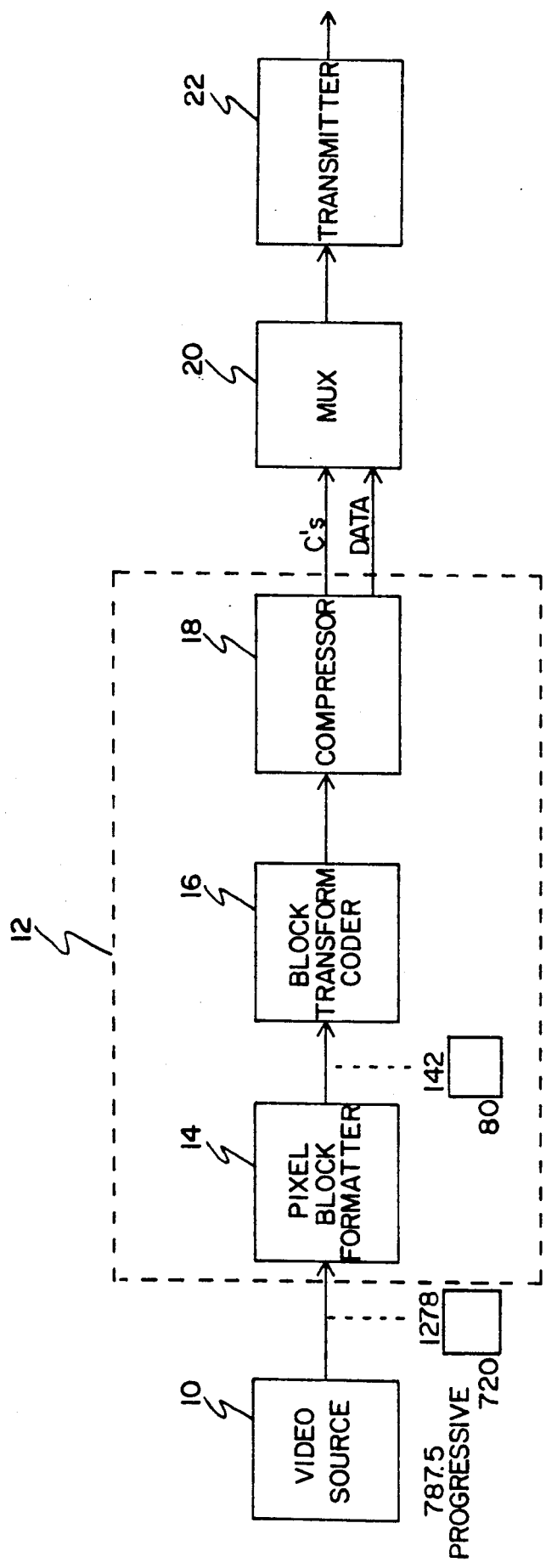
FIG. 1 in a block diagram of an HDTV transmitter according to the present invention.

FIG. 1 illustrates an exemplary HDTV signal transmitter for sub-band coding a wideband video signal for transmission through a standard 6 MHz television channel according to the present invention. In particular, a video source 10 provides a video signal which may have a bandwidth of about 37 MHz. Although not necessarily limited thereto, source 10 preferably provides a progressively scanned video signal having a vertical periodicity equal to the NTSC standard (59.94 Hz) and a horizontal periodicity equal to three (3) times the NTSC standard (47.25 KHz). Each frame of the video signal thus comprises 787.5 lines, of which 720 lines preferably comprise active lines of video pixels. Each line may include, for example, 1278 pixels.

As will be explained in more detail hereinafter, each frame of video pixels is coupled to a sub-band coder 12 which, prior to compression, generates 11,360 groups of spectral coefficient terms, each group comprising a (9 × 9) block of coefficient terms representing the spectral components of a respective (9×9) block of video pixels.

Sub-band coding may be effected using either spatial filtering or transform coding techniques. When sub-band coding is effected by a block transform, sub-band coder 12 includes a pixel block formatter 14 as shown in FIG. 1, which formats each frame of the applied video signal into a successive series of, for example, (9×9) pixel blocks. Formatter 14 thus structures each frame of the video signal into a (142×80) array of (9×9) pixel blocks, corresponding to 720 lines of 1278 pixels. The pixel blocks are then applied one at a time to a block transform coder 16 (e.g. a DCT coder). Block transform coder 16 generates 81 transform coefficients for each applied (9×9) pixel block, which coefficients are suitably compressed in a data compressor 18 to provide an output video component having a bandwidth suitable for transmission over a standard 6 MHz television channel. The necessary bandwidth reduction may be affected using any of a number of techniques including variable quantization and vector quantization. In a preferred embodiment of the invention, bandwidth reduction is achieved by truncation of selected coefficients within each (9×9) coefficient block. In the latter case, compressor 18 provides a data signal identifying the transmitted coefficients to facilitate subsequent reconstruction of the video image. The compressed coefficients and data signal are applied to respective inputs of a multiplexer 20 where they are combined in a time division multiplexed format for transmission by a transmitter 22 over a 6 MHz television channel.

Figure 2:
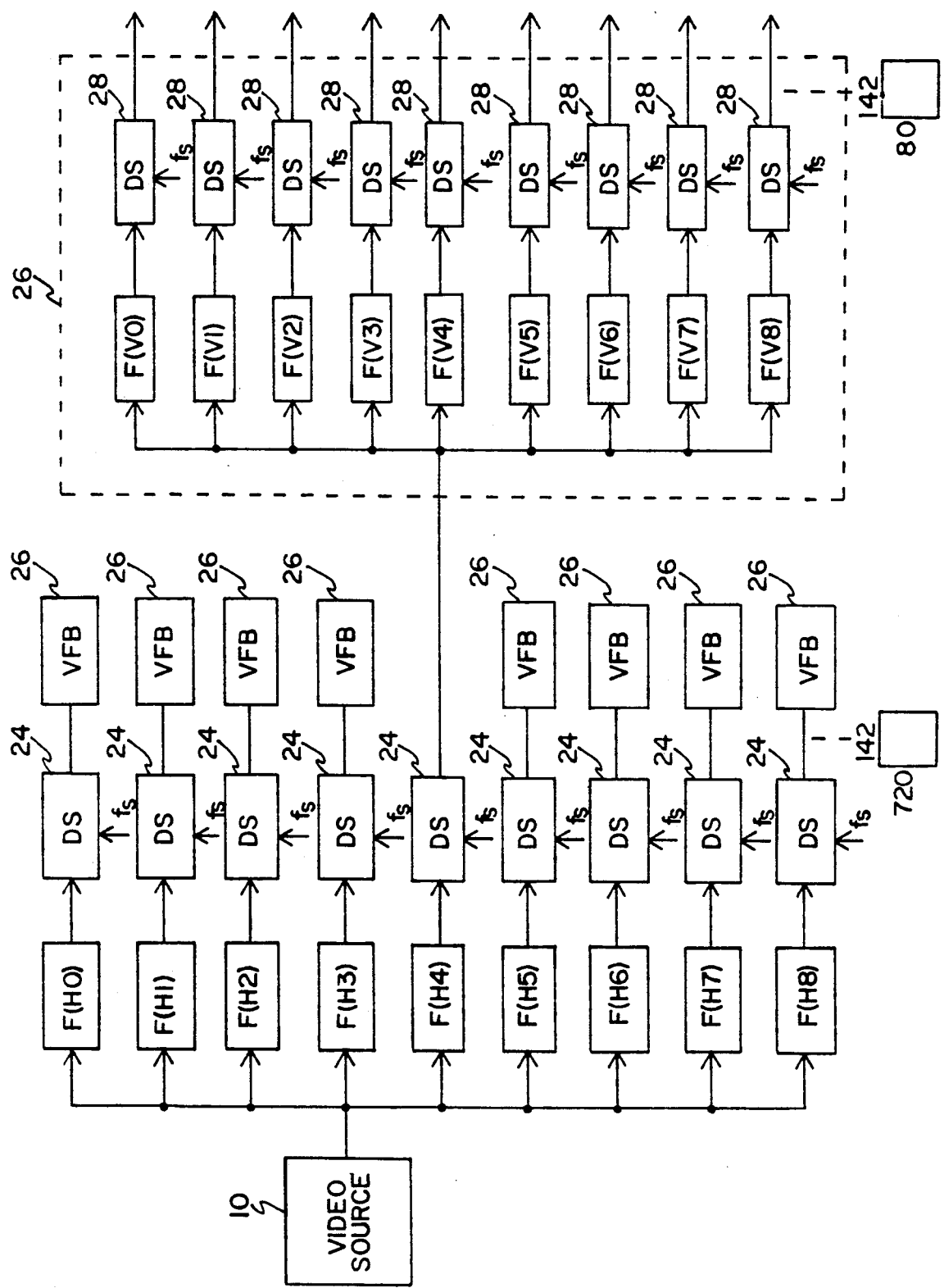
FIG. 2 is a block diagram of an arrangement of quadrature mirror filters useful in connection with the transmitter of FIG. 1.

As referred to previously, sub-band coding may also be effected by a series of spatial filters, such as quadrature mirror filters as shown in FIG. 2. In this case, the video signal from source 10 is applied to an input quadrature mirror filter bank comprising nine (9) parallel horizontal filters F(H0)-F(H8), which separate the source signal into 9 substantially equal horizontal frequency bands. Each horizontal band is down-sampled (i.e. decimated) by a respective down-sampler 24 by a factor of nine (9) in response to a decimation clock signal fs to provide a series of nine (9) horizontally filtered components each Comprising 720 lines of 142 pixels per frame. Each of the nine (9) horizontally filtered components is now applied to a respective vertical filter bank 26. Each vertical filter bank 26 comprises nine (9) filters F(V0)-F(V8) for filtering the respective horizontal components into nine (9) vertical frequency bands, each of which is again down-sampled in a respective down-sampler 28 by a factor of nine (9) in response to decimation clock signal fs. Each vertical filter bank 26 thus provides 81 horizontally and vertically filtered output components, each comprising 80 lines of 142 pixels per frame. Moreover, each of the output components comprises 11,360 (142×80) terms/frame corresponding to one of the 11,360 terms derived each frame for a respective transform coefficient.

Figure 3B:
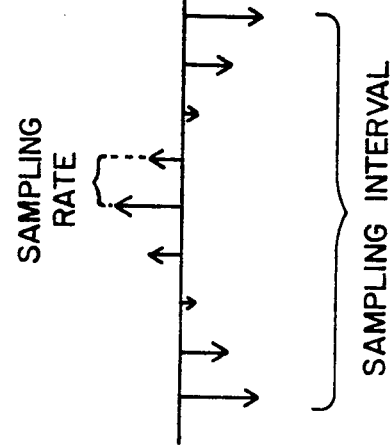
FIG. 3A and 3B illustrate a pair of basis functions useful in encoding an HDTV signal in the transmitter of FIG. 1.
Figure 3A:
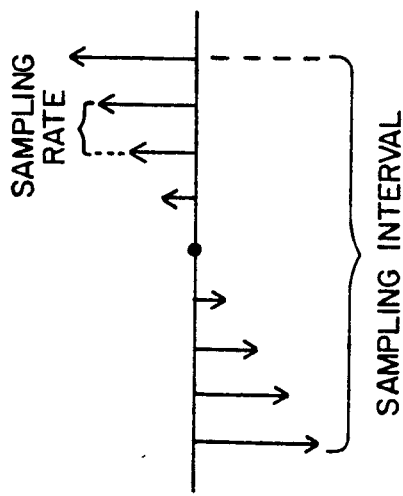

Both sub-band coding process described above generate a coefficient term through a process wherein each pixel of a given (9× 9) pixel block is effectively multiplied with a respective value of an 81 value basis function within a given sampling interval and then summing the results. FIGS. 3A and 3B illustrate two exemplary basis functions which may be used in this process. For purposes of clarity, only 9 values of each basis function are shown, each of these 9 values being repeated nine times to constitute all 81 values of the respective basis function. It will be observed that each basis function has the same sampling interval and the same sampling rate, although the respective functions have different values. Multipliers operating at a rate of about 80 MHz are required to effect the necessary 81 multiplications each sampling interval to derive each coefficient term.

Figure 4:
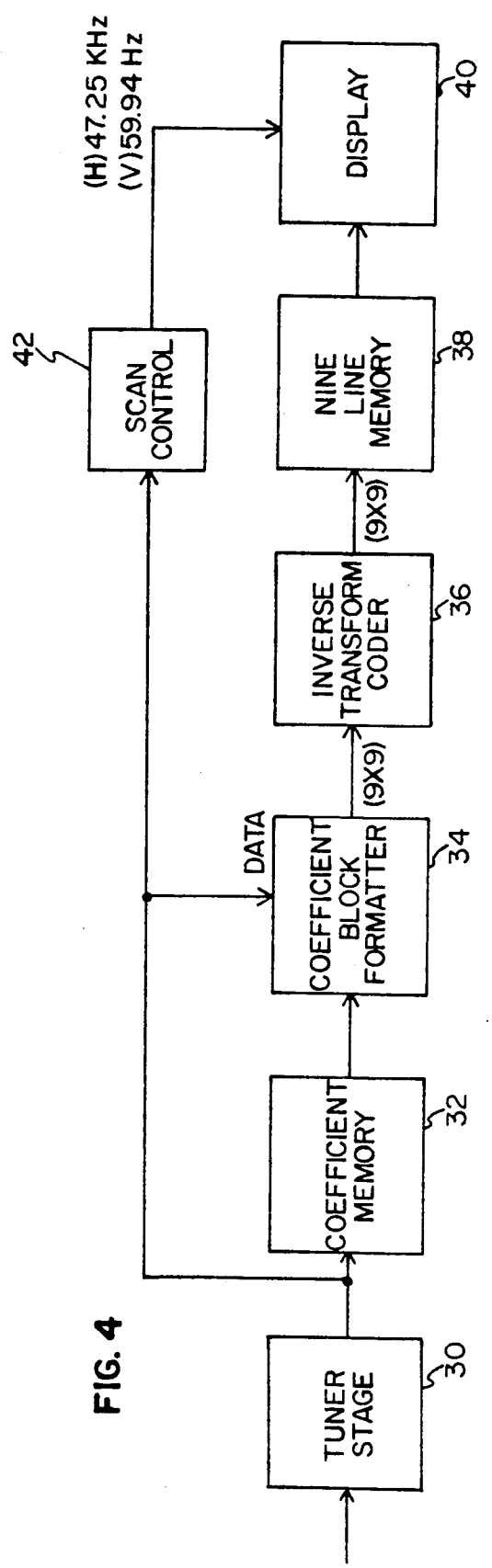
FIG. 4 is a block diagram of a receiver for reproducing a video image at high resolution in response to a signal from the transmitter of FIG. 1.

An exemplary HDTV receiver adapted for receiving the transmitted HDTV signal and for reproducing an image in response thereto is shown in FIG. 4. The transmitted signal, including the compressed sub-band coefficients and data, is received and demodulated by a tuner stage 30. The received coefficients are supplied to a coefficient memory 32 of sufficient size for storing the maximum number of coefficients which may be transmitted each frame, e.g. 24 coefficients. The data signal identifying the received coefficients is applied to one input of a coefficient block formatter 34, the second input of which is supplied with the received coefficients stored in memory 32.

Coefficient block formatter 34 reconstructs a (9×9) coefficient block representing the corresponding received block, with each truncated coefficient being represented by a zero-value term. The reconstructed coefficient blocks are then applied to an inverse transform coder 36 which provides an output comprising a representation of the corresponding (9×9) source video pixel block. Transform coder 36, which operates at a rate of about 80 MHz, employs a series of basis functions to derive the blocks of video pixels which are the inverse of the basis functions employed in the transmitter of FIG. 1 to encode the source video signal. The reconstructed pixel blocks are stored in a 9-line pixel memory 38 whose output drives a display 40 for reproducing a representation of the source video image. In order to reproduce the image at maximum resolution, the display 40 is progressively scanned for providing a raster comprising 787.5 horizontal lines during each 59.94 Hz frame. The raster includes 720 horizontal lines of active video corresponding to the 720 lines of the source video signal, with each reproduced (9×9) pixel block spatially corresponding to a respective (9×9) pixel block of the source signal. Scan control signals are supplied to the display 40 from a scan control circuit 42 which is responsive to received synchronizing signals.

Figure 5:
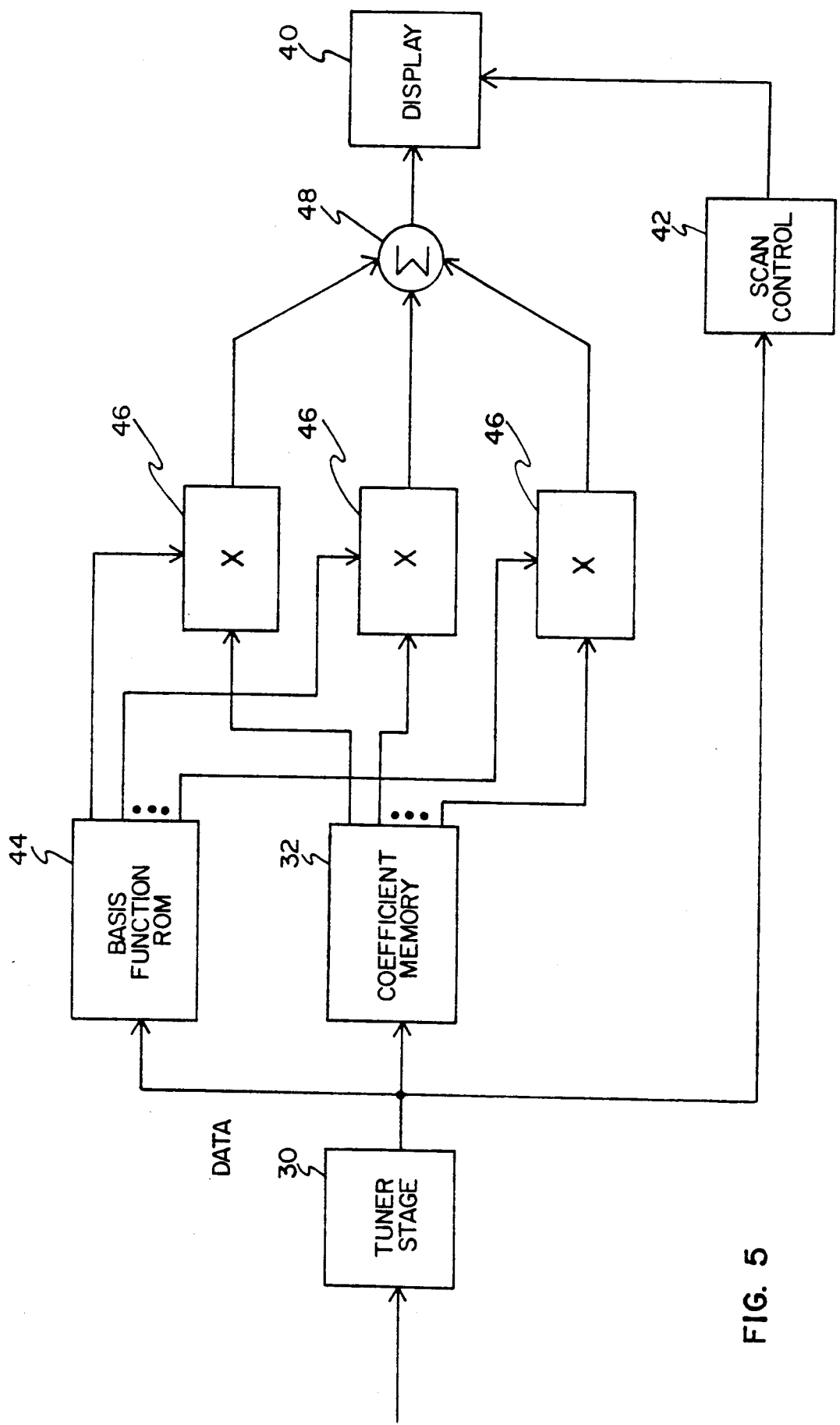
FIG. 5 is a block diagram of an alternate embodiment of the receiver of FIG. 4.

The operation of the receiver may be more readily understood from the alternate embodiment illustrated in FIG. 5. In this embodiment, the data signal identifying the received coefficients is supplied to as basis function ROM 44 which stores the 81 values of each of the 81 inverse basis functions needed to decode the received coefficients. The 24 outputs of coefficient memory 32 are each coupled to one input of a respective multiplier 46, the outputs of which are summed by a summer 48 for application to display 40. A respective output of basis function ROM 44 supplies a second input of each multiplier 46. In operation, each received coefficient stored in coefficient memory 32 is coupled to an input of a respective multiplier 46 and multiplied with a value of the corresponding inverse basis function supplied from ROM 44, the results of the multiplications being summed in summer 48 to generate a given pixel value. Eighty one such operations must therefore be effected to generate a complete (9×9) pixel block within the sampling interval. Each multiplier 46 must therefore operate at a speed of about 80 MHz.

As indicated above, the receivers of FIGS. 4 and 5 are designed for providing the maximum resolution display in response to the received HDTV signal. As a result, the display 40 must be a high resolution display capable of being operated at a horizontal rate of 47.25 KHz and at a vertical rate of 59.94 Hz to produce a progressively scanned raster comprising 787.5 lines per frame, of which 720 lines preferably represent active video. Also, the receiver must be capable of processing (9×9) coefficient blocks at a rate of about 80 MHz to provide corresponding blocks of video pixels for application to the display. The receiver circuitry, particularly coefficient block formatter 34, inverse transform coder 36, memory 38 and multipliers 46 must be capable of operating at speeds similar to those in the transmitter, i.e. about 80 MHz. While the technology for providing the necessary high resolution display and high speed processing circuits certainly exists, both are relatively costly and would impose a limitation on the widespread introduction of HDTV receivers in the near term.

According to the present invention, this limitation is overcome by providing reasonably priced receivers which can co-exist with the receivers of FIGS. 4 and 5, and which will produce a displayed image superior to that which can be achieved by the NTSC system although not with as much resolution as provided by the receivers of FIGS. 4 and 5.

Figure 6:
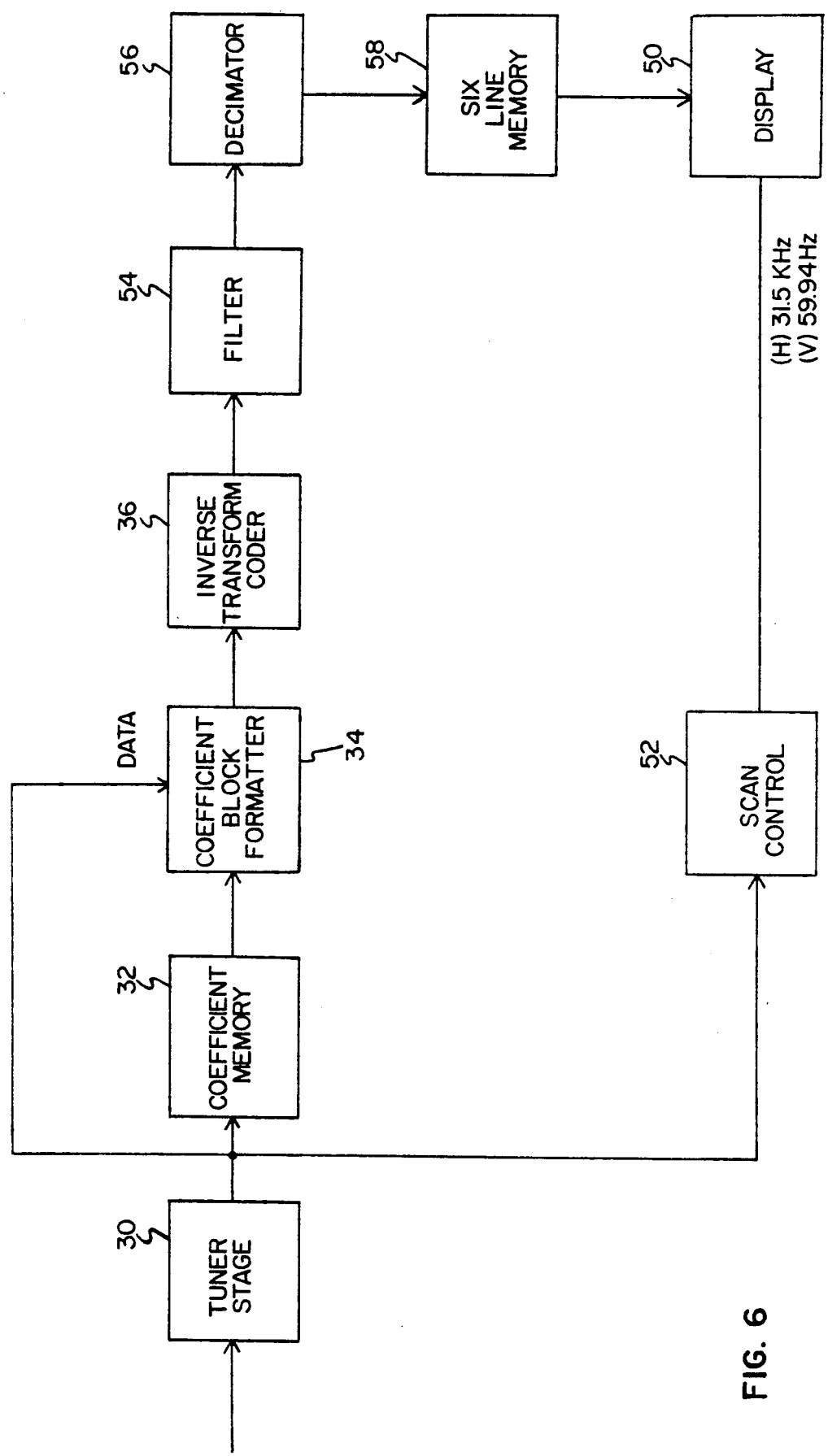
FIG. 6 is a block diagram of a receiver for reproducing a video image in response to a signal from the transmitter of FIG. 1, but at less resolution than the receivers of FIG. 4 and 5.

One embodiment of the receiver of the invention is illustrated in FIG. 6. This receiver is functionally similar to the receiver of FIG. 4 except in two essential respects. Initially, the receiver of FIG. 6 includes a display 50 comprising a conventional consumer CRT which is progressively scanned for providing a raster comprising 525 lines per frame (59.94 Hz). Preferably, the raster includes 480 lines of active video which is the maximum resolution of conventional consumer CRT's. A modified scan control circuit 52 is therefore provided in the receiver of FIG. 6 to provide the necessary deflection signals; a 31.5 KHz horizontal rate deflection signal and a 59.94 Hz vertical deflection signal. These deflection signals can be conveniently generated by scaling the horizontal synchronizing signals supplied to scan control circuit 52 by a factor of $\frac{2}{3}$. Secondly, the output of transform coder 36 is filtered by a filter 54, decimated in a decimator 56 and coupled to display 50 by a six-line memory 58. Decimating the information supplied to display 50, allows for a conventional consumer electronics CRT to be used for reproducing the HDTV image, although not in full resolution.

Referring more particularly to FIG. 6, the HDTV signal is received and demodulated by a tuner stage 30 which may be identical to the tuner used in FIG. 4. The received coefficients are then supplied to coefficient memory 32, which may also be identical to the memory used in FIG. 4, and coupled therefrom to one input of coefficient block formatter 34. Coefficient block formatter 34, in response to the data signal and the received coefficients stored in memory 32, reconstructs a (9×9) coefficient block representing the corresponding original block. The reconstructed (9×9) blocks of coefficients are decoded in inverse transform coder 36 to provide a series of (9×9) pixel blocks which are coupled by filter 54 to decimator 56. Decimator 56 decimates each pixel block by a factor of $\frac{2}{3}$ in both the horizontal and vertical directions to provide a series of (6×6) pixel blocks for application to display 50 through memory 58.

Each reproduced video frame will therefore comprise a (142×80) array of (6×6) pixel blocks, with each (6×6) block spatially corresponding to a respective (9×9) block of the original source image. The block structure of the reproduced image is thus identical to the block structure of the source image, except that it comprises (6×6) pixel blocks instead of (9×9) pixel blocks. Moreover, since 80 pixel blocks are provided in the vertical direction, 480 lines of active video corresponding to an NTSC frame may be conveniently provided for display on display 50.

Figure 7:
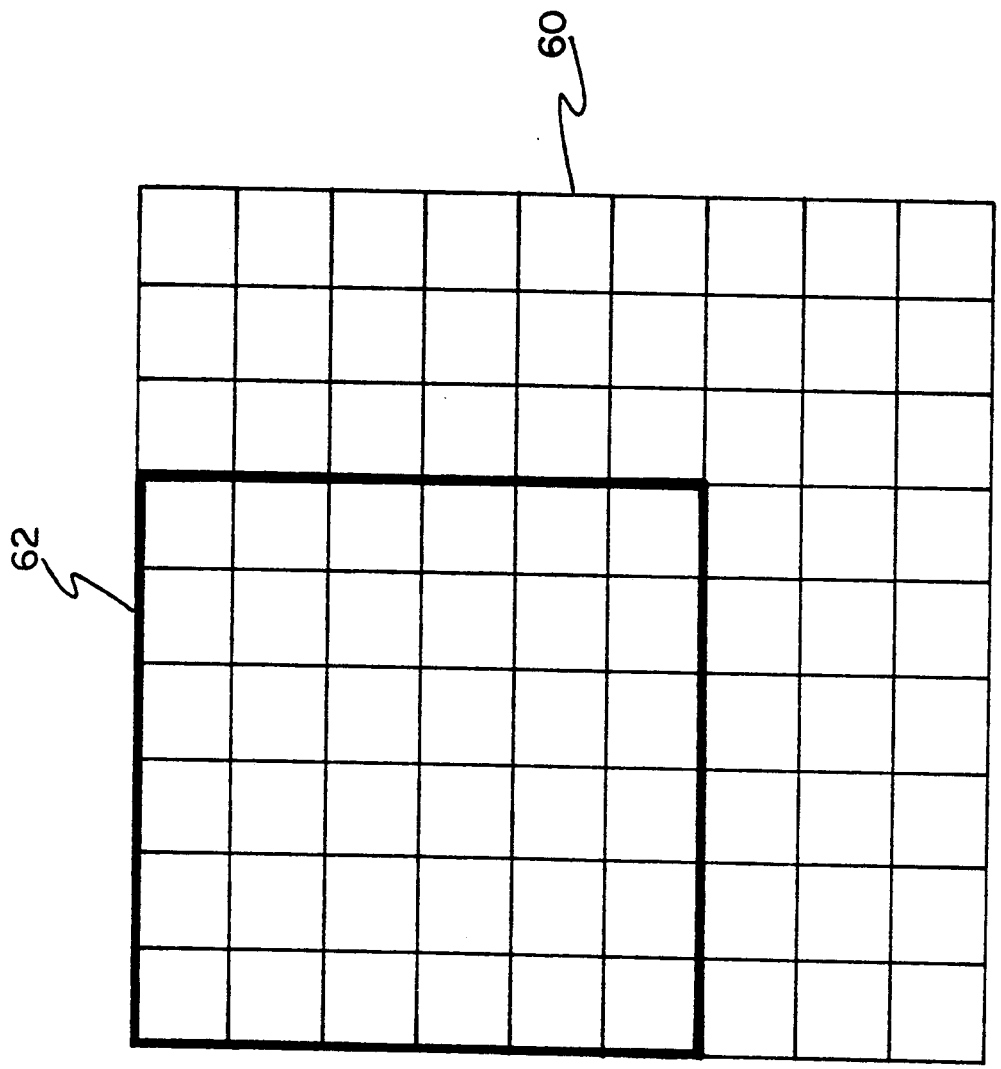
FIG. 7 is a diagram useful in explaining the operation of the receivers of FIGS. 4-6.

The operation of decimator 56 is illustrated in FIG. 7. Each reconstructed (9×9) pixel block generated by inverse transform coder 36 is represented by reference numeral 60 and is decimated to provide a corresponding (6×6) pixel block 62. While other decimation factors are within the scope of the invention, the factor of $\frac{2}{3}$ is considered optimal in that it provides a precise match to the reduction in display resolution which has also been reduced by a factor of $\frac{2}{3}$, i.e. 720 to 480 horizontal lines. Thus, the $\frac{2}{3}$ decimation factor provides a reconstructed video signal characterized by the maximum resolution which can be reproduced by the 525 line CRT of display 50. Decreasing the decimation factor would provide a video signal having resolution which could not b reproduced by the CRT and increasing the decimation factor would provide a video signal which would not fully exploit the resolution capabilities of the CRT.

It will be understood that the receiver of FIG. 5 could also be modified to drive a progressively scanned 525 line consumer electronics CRT. In this case, the output of summer 48 would be filtered and decimated as described above to provide the reduced resolution video signal to the CRT.

The receiver of FIG. 6, through the use of a conventional consumer electronics CRT, allows for the introduction of a reduced cost HDTV receiver. However, whether implemented as shown in FIG. 6 or on the basis of the receiver shown in FIG. 5, relatively expensive circuits are still required to process the received HDTV signal. In particular, both embodiments require the use of multipliers operating at rates of about 80 MHz to reconstruct the (9 ×9) pixel blocks. The receiver of FIG. 8 addresses this problem by directly incorporating the function of decimator 56 within the coefficient decoding circuits.

Figure 8:
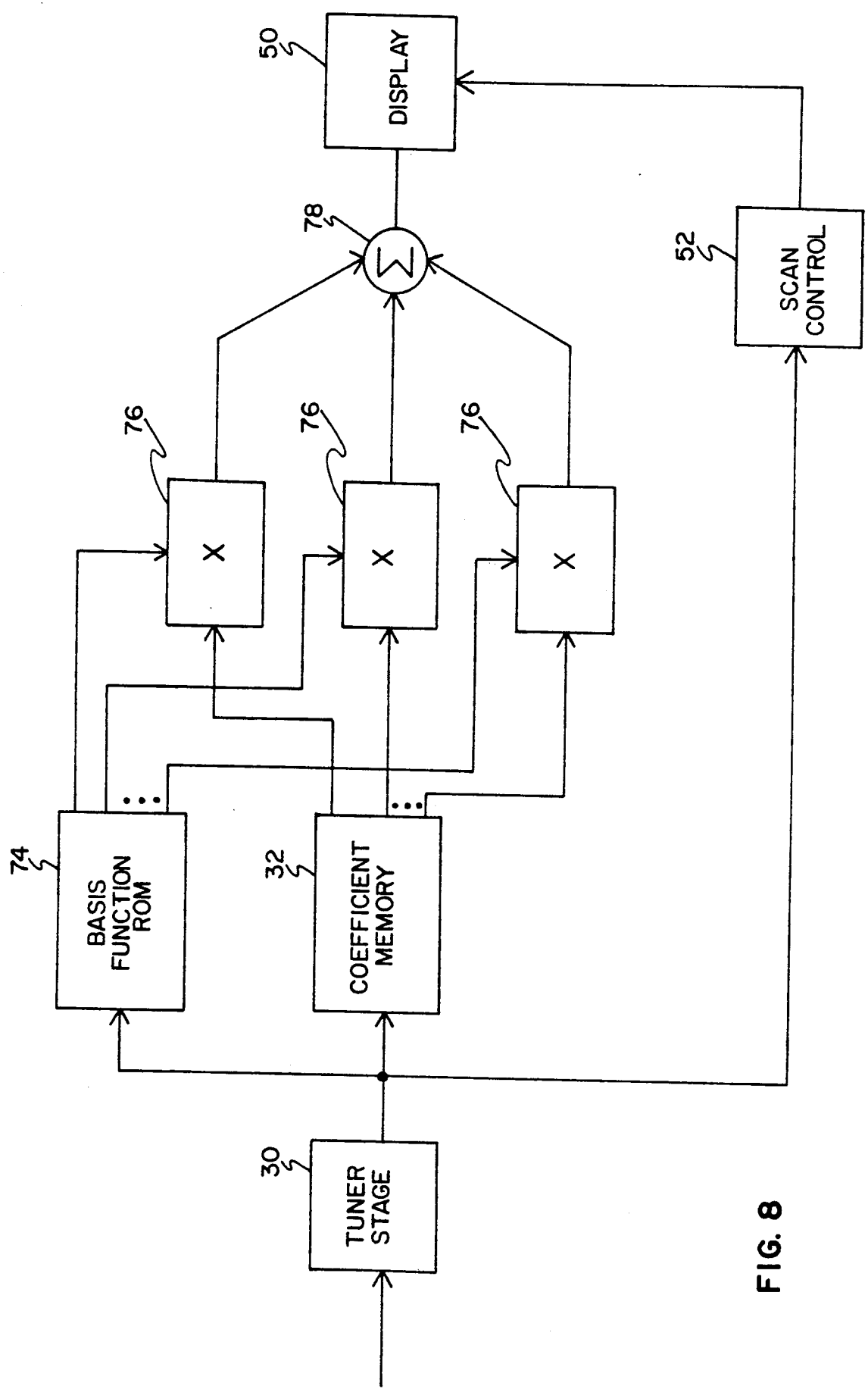
FIG. 8 is a block diagram of a prepared alternate embodiment of the receiver of FIG. 6.

Referring to FIG. 8, it will be seen that the receiver is similar to the receiver of FIG. 5 in many respects. It thus includes a tuner stage 30 and a coefficient memory 32 which may be identical to the corresponding circuits used in FIG. 5. The receiver also includes a scan control 52 and a display 50 (comprising a conventional consumer electronics CRT) for providing a 525 line progressively scanned raster (including 480 lines of active video) as described in connection with the receiver of FIG. 6. The pixel reconstruction circuits of the receiver are however quite different from those contemplated by the receiver of FIG. 5. In particular, a basis function ROM 74 stores a different series of basis functions than stored in ROM 44 and multipliers 76 and summer 78 operate at a reduced rate relative to multipliers 46 and summer 48. More specifically, basis function ROM 74 stores 36 unique basis functions, each having only 36 values (compared to the 81 values for each basis function stored in ROM 44) for decoding a respective one of the 36 lowest order coefficients which may be received and stored in coefficient memory 32, the remaining 45 higher order coefficients being effectively ignored by the receiver. Since only 36 multiplications are thus required during a sampling interval, multipliers 76 and summer 48 need only operate at a rate of about 35.5 MHz rather than the 80 MHz rate required of the corresponding circuits of FIG. 5. This amounts to a reduction in required operating speed of 4/9 and corresponds to decimating the generated pixel blocks by a factor of ⅔ in the horizontal direction and by a factor of ⅔ in the vertical direction. The combination of the use of relatively low speed, and thereby relatively low cost, signal processing circuits together with a conventional consumer electronics CRT allows for the introduction of reasonably priced receivers capable of reproducing the transmitted HDTV image, although not at full resolution.

Figure 9A:
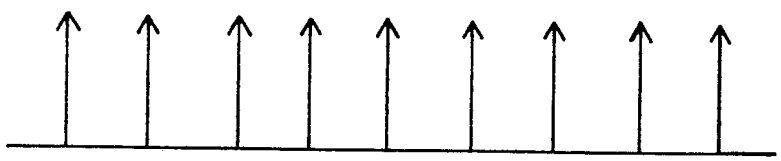
Figure 10A:
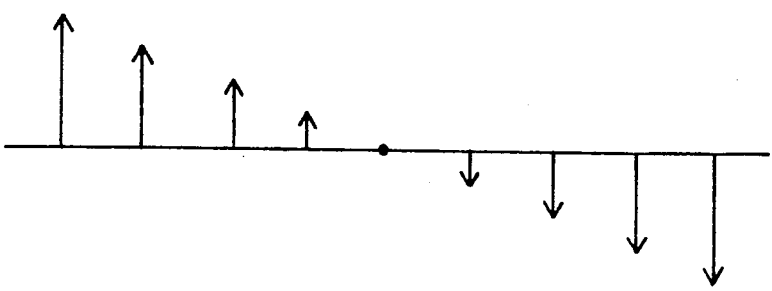
Figure 11A:
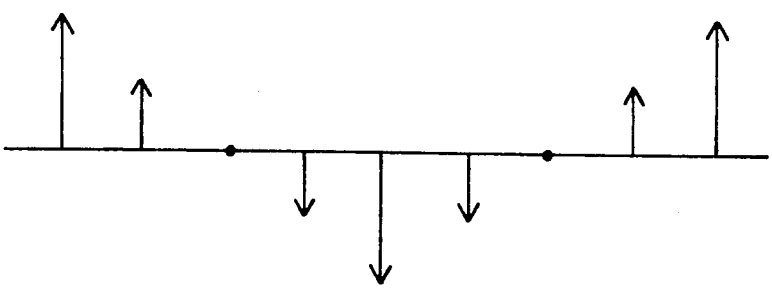

The difference between the inverse basis functions stored in ROM's 44 and 74 is illustrated in FIGS. 9A, B, 10A,B, 11A, B. Each of FIGS. 9A, 10A and 11A shows one direction of a respective basis function as it would be stored in ROM 44 of the full resolution receiver of FIG. 5. The nine values shown in FIG. 9A represent the basis function for the D.C. coefficient term and would be repeated nine times providing a total of 81 values. Similarly, the nine values shown in FIGS. 10A and 11A respectively represent the basis functions for the first two coefficients in the horizontal direction and each would also be repeated nine times for providing a total of 81 values. As indicated previously, each multiplier 46 of FIG. 5 must operate at a rate of about 80 MHz to multiply each of the 81 values of a respective basis function with its corresponding coefficient within the time of a sampling interval to reconstruct the (9×9) pixel blocks at the output of summer 48.

Figure 9B:
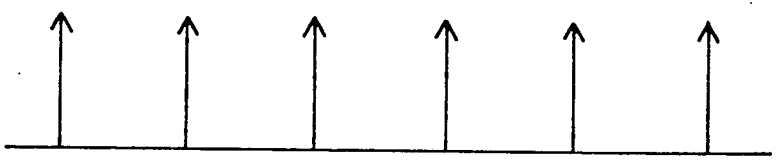
Figure 10B:
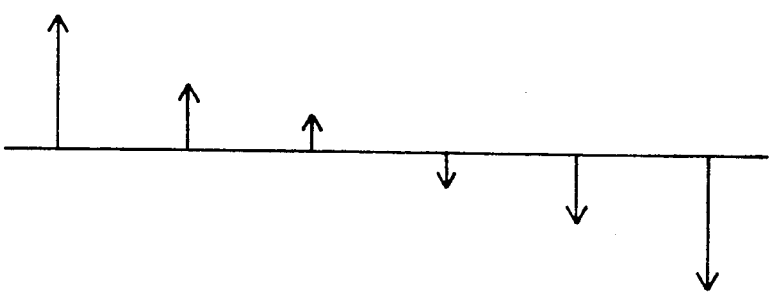
Figure 11B:
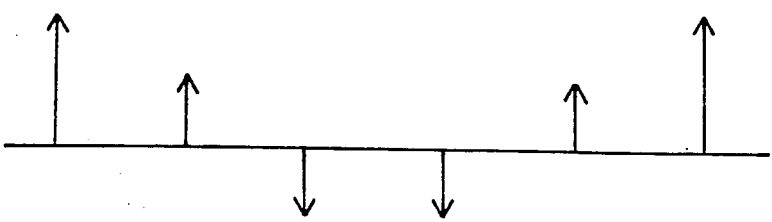

FIGS. 9B, 10B and 11B show the values of the corresponding modified basis functions stored in ROM 74 of the receiver of FIG. 8 in accordance with the present invention. It will be seen that the sampling intervals of the modified basis function are the same as the original functions (FIGS. 9A–11A), but that the sampling rate is reduced by a factor of ⅔ in both the horizontal and vertical directions. Thus, each of the modified basis functions includes only 36 values (instead of 81) and can be processed by multipliers 76 and summer 78 at a rate of only about 35.5 MHz to provide (6×6) pixel blocks for application to display 50. Circuitry operating at these rates is relatively inexpensive and, together with the use of a conventional consumer grade CRT in display 50, provides an extremely reasonably priced receiver for reproducing the transmitted HDTV image. As mentioned previously, while the image will not be reproduced in full resolution, it will nevertheless be superior to a reproduced NTSC image. Moreover, optimum performance is provided by matching the reduction in display resolution with the reduction in resolution due to signal processing.

The optimized lower resolution receiver of FIG. 8 was derived as a modification of the full resolution receiver of FIG. 5, as described above. It will be understood that similar benefits can be achieved according to the invention by modifying the full resolution receiver of FIG. 6 to derive a corresponding optimized lower resolution receiver.

In the embodiments of the invention described above, the video source signal was encoded employing a (9×9) block structure and the receiver was operated either on the basis of a (9×9) block structure for providing a full resolution display or a (6×6) block structure for providing a reduced resolution display. These parameters were selected because the ⅔ ratio between the (6×6) and (9×9) blocks allowed for the reproduction of 480 lines of active video per frame in the low resolution receiver, thereby providing a display coextensive with an NTSC image displayed by the receiver. That is, since the 720 active video lines of the video source signal was structured in terms of 80 vertical blocks of (9×9) pixels, the reproduced image could be conveniently displayed in the form of 80 corresponding vertical blocks of (6×6) pixels to provide the desired 480 lines of active video.

According to another aspect of the invention, the parameters described above may be modified while still taking advantage of the benefits of the invention. In particular, due to the ready availability of processing circuits it may, for example, be desirable to structure the video source signal in terms of (8×8) blocks instead of (9×9) blocks. In this case, the 720 active lines of the source image are formatted to provide 90 vertical blocks of (8×8) pixels. In the receiver, 90 corresponding lower resolution vertical blocks of pixels can be reproduced as described above, but not in a manner to provide the desired 480 display lines per frame. For example, if a (5×5) block structure is employed in the receiver, the 90 vertical blocks will provide 450 display lines each frame. On the other hand, if a (6×6) block structure is employed in the receiver, the 90 vertical blocks will provide 540 display lines each frame. In order to maintain compatibility with an NTSC display, the vertical deflection signal used in a low resolution receiver according to the present invention may be modified such that the reproduced display in either of the foregoing examples is coextensive with the NTSC display. Thus, in the case where a (5×5) block structure is used in the receiver, the amplitude of the vertical deflection signal is increased by the ratio 480:450 to overscan the display by a factor of 1.067. In the case where a (6×6) block structure is used in the receiver, the amplitude of the vertical deflection signal is decreased by the ratio 540:480 to underscan the display by a factor of 1.125. In both cases, the size of the display in the vertical direction will be adjusted to be coextensive with an NTSC display of 480 lines. In the former case, the 450 display lines are vertically stretched to provide a display coextensive with a 480 line NTSC image displayed by the receiver and in the latter case the 540 lines are vertically compressed to provide a display coextensive with a 480 line NTSC display.

While particular embodiments of the present invention have been shown and described, it will be obvious to those skilled in the art that charges and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A television signal transmission system comprising:
   means for sub-band coding a wideband video signal characterized by a raster comprising P progressively scanned horizontal lines per frame for providing a plurality of (×N) blocks of spectral coefficients, each of said N×N blocks representing a respective spatial portion of a frame of said video signal;
   means for compressing the coefficients of each of said (N×N) blocks;
   means for transmitting said compressed coefficients;

means for receiving said transmitted compressed coefficients;

processing means responsive to said received coefficients for deriving a block of video pixels of dimension (n × n) corresponding to each of said blocks of coefficients, where n is less than N by a first selected factor; and display means responsive to said derived pixels for reproducing a video image characterized by a raster comprising p progressively scanned horizontal lines per frame, where p is less than P by a second selected factor, representing sad wideband video signal.

2. The system of claim 1 wherein said first and second selected factors represent corresponding reductions in resolution.

3. The system of claim 2 wherein said first and second selected factors equal $\frac{2}{3}$.

4. The system of claim 3 wherein N=9, n=6, P=787.5 and p=525.

5. The system of claim 5 wherein said wideband video signal is characterized by horizontal and vertical scan rates of about 47.25 KHz and 59.94 Hz respectively and wherein said reproduced video image KHz and 59.94 Hz respectively.

6. A television signal transmission system comprising:

means for sub-band coding a wideband video signal for providing a plurality of (N × N) blocks of spectral coefficients, each of said (N × N) blocks representing a respective spatial portion of a frame of said video signal, said sub-band coding means comprising a first set of coding functions used to derive said (N × N) blocks of coefficients;

means for compressing the coefficients of each of said (N × N) blocks;

means for transmitting said compressed coefficients;

means for receiving said transmitted compressed coefficients;

processing means comprising a second set of non-inverse decoding functions responsive to said received coefficients for deriving a block of video pixels of dimension (n × n) corresponding to each of said blocks of coefficients, where n is less than N by as first selected factor; and display means responsive to said derived pixels for reproducing a video image representing said wideband video signal.

7. The system of claim 6 wherein said wideband video signal is characterized by a raster comprising P progressively scanned horizontal lines per frame and wherein said reproduced video image is characterized by a raster comprising p progressively scanned horizontal lines per frame, where p is less than P by a second selected factor.

8. The system of claim 7 wherein N=9, n=6, P=787.5 and p=525.

9. The system of claim 8, wherein said wideband video signal is characterized by horizontal and vertical scan rates of about 47.25 KHz and 59.94 Hz respectively and wherein said reproduced video image is characterized by horizontal and vertical scan rates of about 31.5 KHz and 59.94 Hz respectively.

10. A television signal transmission system comprising:

means for sub-band coding a wideband video signal for providing a plurality of (N × N) blocks of spectral coefficients, each of said (N × N) blocks representing a respective spatial portion of a frame of said video signal;

means for compressing the coefficients of each of said (N × N) blocks;

means for transmitting said compressed coefficients;

means for receiving said transmitted compressed coefficients;

processing means responsive to said received coefficients for deriving a block of video pixels of dimension (n × n) corresponding to each of said blocks of coefficients, where n is less than N by a first selected factor; and display means responsive to said derived pixels for reproducing a video image representing said wideband video signal which is coextensive with a reproduced NTSC image.

11. The system of claim 10 wherein said wideband video signal comprises 720 active video lines and wherein said reproduced video image comprises 480 active video lines.

12. The system of claim 10 including means for adjusting the vertical size of said reproduced video image for providing a display coextensive with a reproduced NTSC image.

13. The system of claim 10 including means for vertically expanding said reproduced video image for providing a display coextensive with a reproduced NTSC image.

14. The system of claim 13 wherein said wideband video image comprises 720 active video lines, said reproduced video image comprises 450 active video lines, N=8 and n=5.

15. The system of claim 10 including means for vertically compressing said reproduced video image for providing a display coextensive with a reproduced NTSC image.

16. The system of claim 15 wherein said wideband video image comprises 720 active video lines, said reproduced video image comprises 540 active video lines, N=8 and n=6.

17. A television signal transmission system comprising:

means for providing a wideband video signal comprising 787.5 progressively scanned horizontal lines per frame and having horizontal and vertical periodicities of about 47.25 KHz and 59.94 Hz respectively;

means for sub-band coding said wideband video signal for providing a plurality of (N × N) blocks of spectral coefficients, each of said (N × N) blocks representing a respective spatial portion of a frame of said video signal;

means for compressing the coefficients of each of said (N × N) blocks for reducing the bandwidth required for their transmission;

means for transmitting said compressed coefficients;

means for receiving said transmitted compressed coefficients;

processing means responsive to said received coefficients for deriving a block of video pixels of dimension (n × n) corresponding to each of said blocks of coefficients; and display means responsive to said derived pixels for reproducing a video image representing said wideband video signal, said video image being coextensive with a reproduced NTSC image and comprising 525 progressively scanned horizontal lines per frame and having horizontal and vertical periodicities of about 31.5 HKz and 59.94 Hz respectively.

18. The system of claim 17 wherein said sub-band coding means comprises a first set of $N^2$ coding functions for deriving said (N× N) coefficient blocks and wherein said processing means comprises a second set of $n^2$ non-inverse decoding functions for deriving said (n ×n) blocks of video pixels.

19. The system of claim 18 including means for adjusting the vertical size of said reproduced video image for providing a display coextensive with a reproduced NTSC image.

20. A television signal transmission system comprising:
   means for sub-band coding a wideband video signal for providing a plurality of (N×N) blocks of spectral coefficients, each of said (N×N) blocks representing a respective spatial portion of a frame of said video signal;
   means for compressing the coefficients of each of said (N×N) blocks for reducing the bandwidth required for their transmission;
   means for transmitting said compressed coefficients;
   first means for receiving said transmitted coefficients, for deriving therefrom a first block of video pixels of dimension (N×N) corresponding to each of said blocks of coefficients and for producing a high resolution first video image in response thereto; and
   second means for receiving said transmitted coefficients, for deriving therefrom a second block of video pixels of dimension (n× n) corresponding to each of said blocks of coefficients, where n is less than N by a selected factor, and for producing a second video image in response thereto having less resolution than said first video image.

21. The system of claim 20 wherein said sub-band coding means comprises a first set of $N^2$ coding functions for deriving said (N× N) blocks of coefficients, wherein said first means comprises a second set of $N^2$ inverse decoding functions for deriving said (N×N) block of video pixels and wherein said second means comprises a third set of $n^2$ non-inverse decoding functions for deriving said (n×n) blocks of video pixels.

22. The system of claim 21 wherein said wideband video signal and said high resolution video image comprise 787.5 progressively scanned horizontal lines and are characterized by horizontal and vertical periodicities of about 47.25 KHz and 59.94 Hz respectively and wherein said second video image comprises 525 progressively scanned horizontal lines and is characterized by horizontal and vertical periodicities of about 31.5 KHz and 59.94 Hz respectively.

23. The system of claim 22 wherein said second means comprises means for producing said second video image coextensively with a reproduced NTSC image.

24. The system of claim 23 wherein said wideband video image comprises 720 active video lines, said second image comprises 480 active video lines, N=9 and n=6.

25. The system of claim 23 wherein said wideband video image comprises 720 active video lines, said second image comprises 450 active video lines, N=8 and n=5, and including means for vertically expanding said second video image for providing a display coextensive with a reproduced NTSC image.

26. The system of claim 23 wherein said wideband video signal comprises 720 active video lines, said second image comprises 540 active video lines, N=8 and n=6, and including means for vertically compressing said second video image for providing a display coextensive with a reproduced NTSC image.

27. In a television signal transmission system of the type including means for sub-band coding a wideband video signal for providing a plurality of (N×N) blocks of spectral coefficients, each of said (N ×N) blocks representing a respective spatial portion of a frame of said video signal, means for compressing the coefficients of each of said (N×N) blocks for reducing the bandwidth required for their transmission and means for transmitting said compressed coefficients, a television signal receiver comprising:
   means for receiving said compressed transmitted coefficients;
   processing means responsive to said received coefficients for deriving a block of video pixels of dimension (n×n) corresponding to each of said blocks of coefficients, where n is less than N by a selected factor; and
   display means responsive to said derived pixels for reproducing a video image representing said wideband video signal.

28. The receiver of claim 27 wherein said wideband video signal is characterized by a raster comprising P progressively scanned horizontal lines per frame and wherein said reproduced video image is characterized by a raster comprising p progressively scanned horizontal lines per frame, where p is less than P by a second selected factor.

29. The receiver of claim 28 wherein said first and second selected factors represent corresponding reductions in resolution.

30. The receiver of claim 29 wherein said first and second selected factors equal ⅔.

31. The receiver of claim 30 wherein N=9, n=6, P=787.5 and p =525.

32. The receiver of claim 31 wherein said wideband video signal is characterized by horizontal and vertical scan rates of about 47.25 KHz and 59.94 Hz respectively and wherein said reproduced video image is characterized by horizontal and vertical scan rates of about 31.5 KHz and 59.94 Hz respectively.

33. The receiver of claim 28 wherein said sub-band coding means comprises a first set of coding functions used to derive said (N×N) blocks of coefficients and wherein said processing means comprises a second set of non-inverse decoding functions for deriving said (n × n) blocks of video pixels.

34. The receiver of claim 33 wherein said wideband video signal is characterized by a raster comprising P progressively scanned horizontal lines per frame and wherein said reproduced video image is characterized by a raster comprising p progressively scanned horizontal lines per frame, where p is less than P by a second selector factor.

35. The receiver of claim 34 wherein N=9, n=6, P=787.5 and p= 525.

36. The receiver of claim 35 wherein said wideband video signal is characterized by horizontal and vertical scan rates of about 47.25 KHz and 59.94 Hz respectively and wherein said reproduced video image is characterized by horizontal and vertical scan rates of about 31.5 KHz and 59.94 Hz respectively.

37. The receiver of claim 27 wherein said display means comprises means responsive to said derived pixels for reproducing a video image representing said wideband video signal which is coextensive with a reproduced NTSC image.

38. The receiver of claim 37 wherein said wideband video signal comprises 720 active video lines and wherein said reproduced video image comprises 480 active video lines.

39. The receiver of claim 37 including means for adjusting the vertical size of said reproduced video image for providing a display coextensive with a reproduced NTSC image.

40. The receiver of claim 37 including means for vertically expanding said reproduced video image for providing a display coextensive with a reproduced NTSC image.

41. The receiver of claim 40 wherein said wideband video image comprises 720 active video lines, said reproduced video image comprises 450 active video lines, $N=8$ and $n=5$.

42. The receiver of claim 37 including means for vertically compressing said reproduced video image for providing a display coextensive with a reproduced NTSC image.

43. The receiver of claim 42 wherein said wideband video image comprises 720 active video lines, said reproduced video image comprises 540 active video lines, $N=8$ and $n=6$.

44. In a television signal transmission system of the type including means for providing a wideband video signal comprising 787.5 progressively scanned horizontal lines per frame and having horizontal and vertical periodicities of about 47.25 KHz and 59.94 Hz respectively, means for sub-band coding said wideband video signal for providing a plurality of $(N \times N)$ blocks of spectral coefficients, each of said $(N \times N)$ blocks representing a respective spatial portion of a frame of said video signal, means for compressing the coefficients of each of said $(N \times N)$ blocks for reducing the bandwidth required for their transmission and means for transmitting said compressed coefficients, a television signal receiver comprising:

means for receiving said compressed transmitted coefficients;

processing means responsive to said received coefficients for deriving a block of video pixels of dimension $(n \times n)$ corresponding to each of said blocks of coefficients; and display means responsive to said derived pixels for reproducing a video image representing said wideband video signal, said video image being coextensive with a reproduced NTSC image and comprising 525 progressively scanned horizontal lines per frame and having horizontal and vertical periodicities of 31.5 KHz and 59.94 Hz respectively.

45. The receiver of claim 44 wherein said sub-band coding means comprises a first set of $N^2$ coding functions for deriving said $(N \times N)$ blocks of coefficients and wherein said processing means comprises a second set of $n^2$ non-inverse decoding functions for deriving said $(n \times n)$ blocks of video pixels.

46. The receiver of claim 45 wherein said wideband video image comprises 720 active video lines, said reproduced video image comprises 480 active video lines, $N=9$ and $n=6$.

47. The receiver of claim 45 including means for adjusting the vertical size of said reproduced video image for providing a display coextensive with a reproduced NTSC image.

48. The receiver of claim 47 wherein said wideband video image comprises 720 active video lines, said reproduced video image comprises 450 active video lines, $N=8$ and $n=5$, and including means for vertically expanding said second video image for providing a display coextensive with a reproduced NTSC image.

49. The receiver of claim 47 wherein said wideband video signal comprises 720 active video lines, said reproduced video image comprises 540 active video lines, $N=8$ and $n=6$, and including means for vertically compressing said second video image for providing a display coextensive with a reproduced NTSC image.

* * * * *